United States Patent
Ji (10) Patent No.: US 10,589,674 B2
(45) Date of Patent: Mar. 17, 2020

(54) SYSTEM FOR SENSING HEIGHT OF OBSTACLE FOR PARKING ASSISTANCE

(71) Applicants: Hyundai Motor Company, Seoul (KR); Kia Motors Corporation, Seoul (KR)

(72) Inventor: Sung Min Ji, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/184,831

(22) Filed: Nov. 8, 2018

(65) Prior Publication Data
US 2020/0047667 A1   Feb. 13, 2020

(30) Foreign Application Priority Data

Aug. 8, 2018 (KR) ................. 10-2018-0092496

(51) Int. Cl.
| | |
|---|---|
| *B60Q 1/48* | (2006.01) |
| *B60Q 9/00* | (2006.01) |
| *B60N 2/00* | (2006.01) |
| *E05B 77/54* | (2014.01) |
| *G01S 13/931* | (2020.01) |
| *G01S 13/93* | (2020.01) |
| *G01S 7/00* | (2006.01) |

(52) U.S. Cl.
CPC ............ *B60Q 9/008* (2013.01); *B60N 2/002* (2013.01); *E05B 77/54* (2013.01); *E05Y 2900/531* (2013.01); *G01S 7/003* (2013.01); *G01S 13/931* (2013.01); *G01S 2013/9314* (2013.01); *G01S 2013/9367* (2013.01)

(58) Field of Classification Search
CPC ......... B60Q 9/008; B60N 2/002; E05B 77/54; E05Y 2900/531; G01S 7/003; G01S 13/931; G01S 2013/9314; G01S 2013/9367
USPC ....................................... 340/932.2
See application file for complete search history.

(56) References Cited

U.S. PATENT DOCUMENTS

| | | | | |
|---|---|---|---|---|
| 2002/0041239 | A1* | 4/2002 | Shimizu | B60R 1/00 340/932.2 |
| 2007/0076202 | A1* | 4/2007 | Cantin | A01M 7/0096 356/338 |
| 2009/0267797 | A1* | 10/2009 | Kim | G01S 7/539 340/932.2 |
| 2010/0049413 | A1* | 2/2010 | Makino | B60R 1/00 701/65 |
| 2010/0076651 | A1* | 3/2010 | Nakakura | E05C 17/00 701/49 |
| 2011/0057813 | A1* | 3/2011 | Toledo | B60T 7/22 340/932.2 |

(Continued)

*Primary Examiner* — Kerri L McNally
*Assistant Examiner* — Thang D Tran
(74) *Attorney, Agent, or Firm* — Morgan, Lewis & Bockius LLP (57) ABSTRACT

A system for detecting a height of an obstacle for parking assistance, may include a distance measurement module including a distance sensor measuring a distance from an obstacle existing at a side of a vehicle and a wireless transmitter wirelessly transmitting a detecting value of the distance sensor; a wireless receiver receiving the detecting value of the distance sensor from the wireless transmitter; and a controller determining a height of the obstacle on the basis of the received detecting value.

16 Claims, 7 Drawing Sheets

(56) References Cited

U.S. PATENT DOCUMENTS

| | | | | |
|---|---|---|---|---|
| 2012/0050021 | A1* | 3/2012 | Rao | B60N 2/002 |
| | | | | 340/425.5 |
| 2014/0361882 | A1* | 12/2014 | Akiyama | G08G 1/16 |
| | | | | 340/435 |
| 2015/0139556 | A1* | 5/2015 | Jeon | G06K 9/00791 |
| | | | | 382/218 |
| 2015/0266421 | A1* | 9/2015 | Brubaker | B60R 1/00 |
| | | | | 348/148 |
| 2016/0208537 | A1* | 7/2016 | Senguttuvan | B60W 50/0098 |
| 2017/0011338 | A1* | 1/2017 | Stenneth | G06Q 50/30 |
| 2017/0032680 | A1* | 2/2017 | Imai | G08G 1/168 |
| 2017/0210282 | A1* | 7/2017 | Rodriguez Barros | G03B 21/00 |
| 2017/0300062 | A1* | 10/2017 | Kim | G05D 1/0255 |
| 2017/0306684 | A1* | 10/2017 | Baruco | E05F 15/73 |
| 2017/0320433 | A1* | 11/2017 | Zhang | B62D 15/023 |
| 2017/0344837 | A1* | 11/2017 | An | G06T 7/74 |
| 2018/0046194 | A1* | 2/2018 | Adomat | B62D 15/0285 |
| 2018/0300563 | A1* | 10/2018 | Steinmeyer | B60W 40/04 |
| 2019/0017299 | A1* | 1/2019 | Capalau | E05B 77/54 |
| 2019/0120931 | A1* | 4/2019 | Mihajlovic | G01S 13/87 |
| 2019/0176737 | A1* | 6/2019 | Watanabe | B60R 25/31 |

* cited by examiner

SYSTEM FOR SENSING HEIGHT OF OBSTACLE FOR PARKING ASSISTANCE

CROSS REFERENCE TO RELATED APPLICATION

The present application claims priority to Korean Patent Application No. 10-2018-0092496, filed Aug. 8, 2018, the entire contents of which is incorporated herein for all purposes by this reference.

BACKGROUND OF THE INVENTION

Field of the Invention

The present invention relates to a system for detecting the height of an obstacle for parking assistance and, more particularly to a system for detecting the height of an obstacle for parking assistance, the system being able to secure a wider space when a vehicle is automatically parked by a parking assistance system by measuring the heights of obstacles close to sides of the vehicles.

Description of Related Art

A parking assistance system is a system that allows for parking in a parking-possible area by finding a parking-possible area using radar sensors for searching spaces on the front, rear, left and right of a vehicle, and by guiding a driver to operate pedals for shifting, accelerating, and stopping.

Although convenience systems for automatic parking such as the parking assistance system have been provided, statistics show they are actually not frequently used and the reason is that it is complicated to start and finish an automatic parking system and it takes long time to finish parking.

The reason that a parking assistance system takes long time to automatically park is because there is a problem with accuracy of various sensors for recognizing parking situation and the system moves a vehicle through passive traffic lines more than an actual driver for safety during parking.

For example, when parallel parking or perpendicular parking is performed by a parking assistance system, curbs (stones disposed on the border of a roadway) are recognized as a parking-possible space and a traffic line is passively estimated in parking even though it is actually possible to drive a vehicle until the wheels of the vehicle reach the curbs without contiguous to obstacles such as the curbs with the bumper of the vehicle, so it takes long time to finish parking.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for detecting the height of an obstacle for parking assistance, the system being able to measure the height of obstacles (e.g., a curb) close to sides of a vehicle when the vehicle is automatically parked in a parking-possible space by a parking assistance system and being able to secure a wider space in a traffic line in parking when it is determined that the obstacles are high such that vehicle can cross over the obstacles as the result of measuring the heights.

In various aspects of the present invention, a system for detecting a height of an obstacle may include: a distance measurement module including a distance sensor measuring a distance from an obstacle existing at a side of a vehicle and a wireless transmitter wirelessly transmitting a detecting value of the distance sensor; a wireless receiver receiving the detecting value of the distance sensor from the wireless transmitter; and a controller determining a height of the obstacle on the basis of the received detecting value.

The distance sensor may be any one selected from a radar sensor, an subminiature radar sensor, and a laser sensor.

The wireless transmitter and the wireless receivers may be RF type communication modules.

The controller may be configured to determine whether a vehicle can cross over an obstacle through: a process of determining an obstacle recognition angle which is an angle between a start point and an end point where the distance sensor measures a maximum height of the obstacle from a center of a wheel when the wheel is rotating; a process of determining a vertical distance from the center of the wheel to the obstacle using the determined obstacle recognition angle; a process of determining a height of the obstacle using the distance from the center of the wheel to the obstacle, a radius of the wheel, and a tire cross-section height; and a process of comparing the determined height of the obstacle with a vehicle body height stored in advance.

The controller may be configured to determine the obstacle recognition angle by multiplying an output time of a signal detected from a start point to an end point where the distance sensor recognizes the maximum height of the obstacle by an angular speed received from a wheel speed sensor.

The controller may be configured to determine the vertical distance from the center of a wheel to an obstacle using $R_B = R \times \cos(\Phi_B/2)$.

The controller may be configured to determine the height of the obstacle using $H = H_T + (R - R_B)$.

The controller may be configured to determine a height of an obstacle as an average value between a height of an obstacle close to front wheels and a height of an obstacle close to rear wheels.

When the controller is configured to determine the height of the obstacle, the controller may be configured to determine first an obstacle height with respect to front wheels during forward parking and determines first an obstacle height with respect to rear wheels during rear parking.

The controller may include: a storage keeping a vehicle body height of a vehicle and a door height value; and a comparer-determiner comparing the determined height of the obstacle with the vehicle body height or the door height value kept in the storage.

The controller may compare a value obtained by adding a specific offset value to the vehicle body height kept in the storage with the height of the obstacle to determine whether the vehicle can cross over the obstacle, and then, may determine that the vehicle can cross over the obstacle when the value obtained by adding a specific offset value to the vehicle body height is the same as or greater than the height of the obstacle and determines that the vehicle cannot cross over the obstacle when the height of the obstacle is greater.

The controller may further include a warning unit outputting a warning signal for preventing doors from opening to an obstacle at the end portion of parking in a response to a control signal from the controller when the controller is configured to determine that a height of the obstacle is greater than a door height.

When the controller outputs a warning signal to the warning unit, the controller may output warning only when a person is in a seat close to an obstacle by determining whether there is a person in the seat close to the obstacle.

The controller may be configured to determine whether there is a person close to an obstacle by receiving a signal from a seat sensor, a camera for detecting a passenger in a seat, and an ultrasonic sensor that are devices determining whether there is a person close to an obstacle.

When the controller outputs a warning signal for preventing—doors from opening to an obstacle at the end portion of parking, the controller may output first a primary warning signal through a display or a speaker in the vehicle if the door is not open yet, and outputs a signal for performing an automatic door lock function to prevent damage to doors when a door is attempted to be opened.

Various aspects of the present invention are directed to providing the following effects from the method described above.

First, it is possible to measure the height of obstacles (e.g., a curb) close to sides of a vehicle when the vehicle is automatically parked in a parking-possible space by a parking assistance system and it is also possible to secure a wider space in a traffic line in parking when it is determined that the obstacles are high such that vehicle can move over the obstacles as the result of measuring the heights, whereby more stable parking assistance may be achieved.

Second, when it is determined that the height of an obstacle is greater than a door height according to the specification of a vehicle at the end portion of parking, it is possible to prevent a door from being damaged by hitting the obstacle by restricting opening of the door by generating an aural and/or visual warning through a warning unit.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention will be described hereafter in detail with reference to the accompanying drawings.

The present invention addresses making it possible to secure a wider parking area in a traffic line when automatically parking and thereby stably assist parking by measuring the heights of obstacles such as a curb (stones disposed on the border with a roadway) around a vehicle and then determining that tires can cross over the obstacles and when the heights of the obstacles are smaller than the height of the vehicle body (e.g., a bumper cover).

Figure 1A:
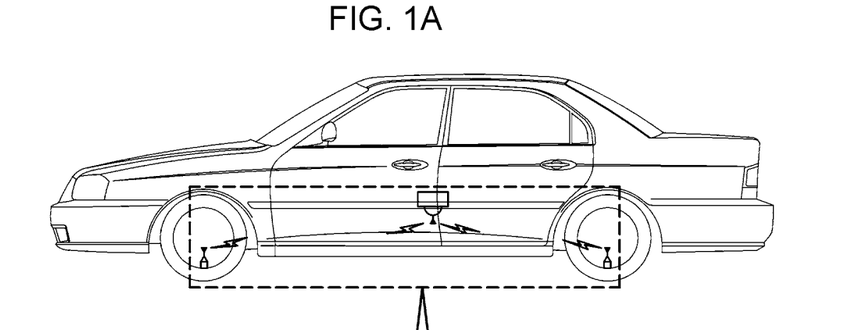
FIG. 1A and FIG. 1B are diagrams showing the configuration of a system for detecting the height of an obstacle for parking assistance according to an exemplary embodiment of the present invention.
Figure 1B:
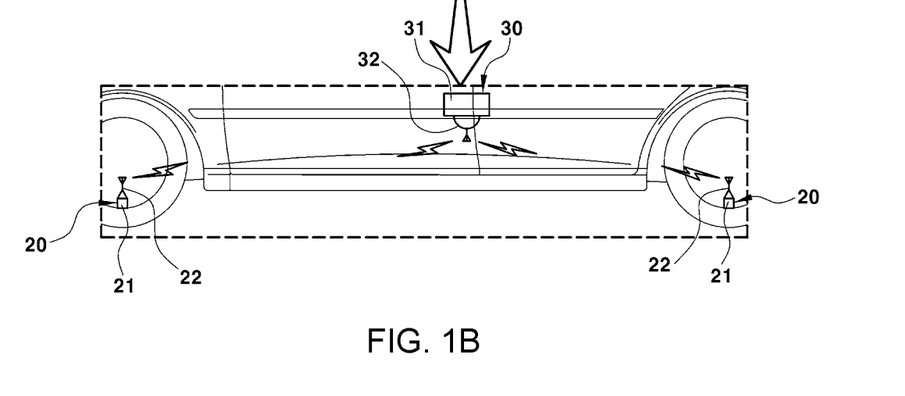

FIG. 1A and FIG. 1B are diagrams showing the configuration of a system for detecting the height of an obstacle for parking assistance according to an exemplary embodiment of the present invention.

As shown in FIGS. 1A and 1B, a distance measurement module 20 that measures the distance from an obstacle such as a curb and outputs the measured detecting value is mounted on each tire wheel 10 of a vehicle.

To the present end, the distance measurement module 20 may include a distance sensor 21 that measures the distance from an obstacle such as a curb at a side of a vehicle and a wireless transmitter 22 that wirelessly transmits the detecting value of the distance sensor.

According to an exemplary embodiment of the present invention, an obstacle height measurement module 30 that measures the height of an obstacle on the basis of a distance measurement-detecting value from the distance measurement module 20 is mounted at a predetermined position on a vehicle body.

To the present end, the obstacle height measurement module 30 includes: a wireless receiver 32 that receives a detecting value of the distance sensor 21 from the wireless transmitter 22 of the distance measurement module 20; and a controller that estimates the height of an obstacle on the basis of the received detecting value.

The controller 31 utilizes rotation speeds of wheel when estimating the height of an obstacle, so wheel speed sensors 40 that detect the rotation speeds of the wheels are connected to the controller 31 to be configured to transmit signals.

The distance sensor 21 may be any one selected from a radar sensor, a subminiature radar sensor, and a laser sensor and various sensors for measuring distances may be selected and used, but it is preferable to use a subminiature radar sensor that has high accuracy in distance measurement and consumes less power.

Since the wheels on which the distance measurement modules 20 are mounted are rotated, it is impossible to supply power from the outside, and so the distance measurement sensors 21 have a built-in battery.

Furthermore, since the wheels on which the distance measurement modules 20 are mounted are rotated, it is preferable to select wireless communication modules using a Radio Frequency (RF) communication type over a wire communication type for the wireless transmitter 22 and the wireless receiver 32.

Accordingly, when a vehicle enters into a parking space by a parking assistance system and the distance sensor 21 of the distance measurement module 20 detects the distance from an obstacle such as a curb, a distance detecting signal is transmitted to the wireless receiver 32 of the obstacle height measurement module 30 through the wireless transmitter 22 and the controller 31 performs determination for estimating the height of the obstacle on the basis of a detecting value received from the wireless receiver 32.

The process of measuring the height of an obstacle by the system for detecting the height of an obstacle according to an exemplary embodiment of the present invention is described hereafter.

Figure 5:
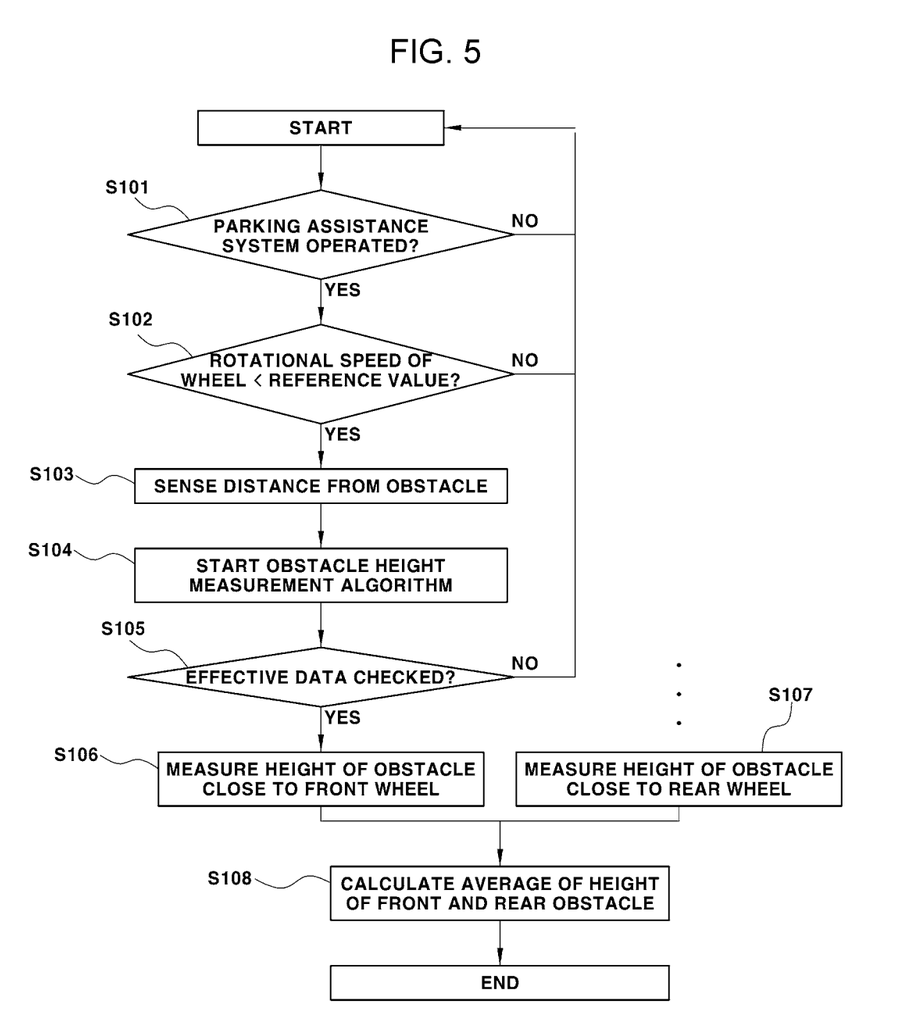
FIG. 5 is a flowchart for controlling the system for detecting the height of an obstacle for parking assistance according to an exemplary embodiment of the present invention.

FIG. 5 is a flowchart for controlling the system for detecting the height of an obstacle for parking assistance according to an exemplary embodiment of the present invention.

First, it is determined whether a common parking assistance system mounted on a vehicle is operated for parking while the vehicle is driven (S101).

When operation of the parking assistance system is started, it is determined whether rotation speeds of wheels transmitted from wheel speed sensors are a reference value or less to increase the measurement accuracy of the distance sensors 21 mounted on the wheels (S102).

Next, when the vehicle enters into a parking space by the parking assistance system, the distance sensors 21 of the distance measurement module 20 detect the distance from an obstacle such as a curb (S103).

Figure 2:
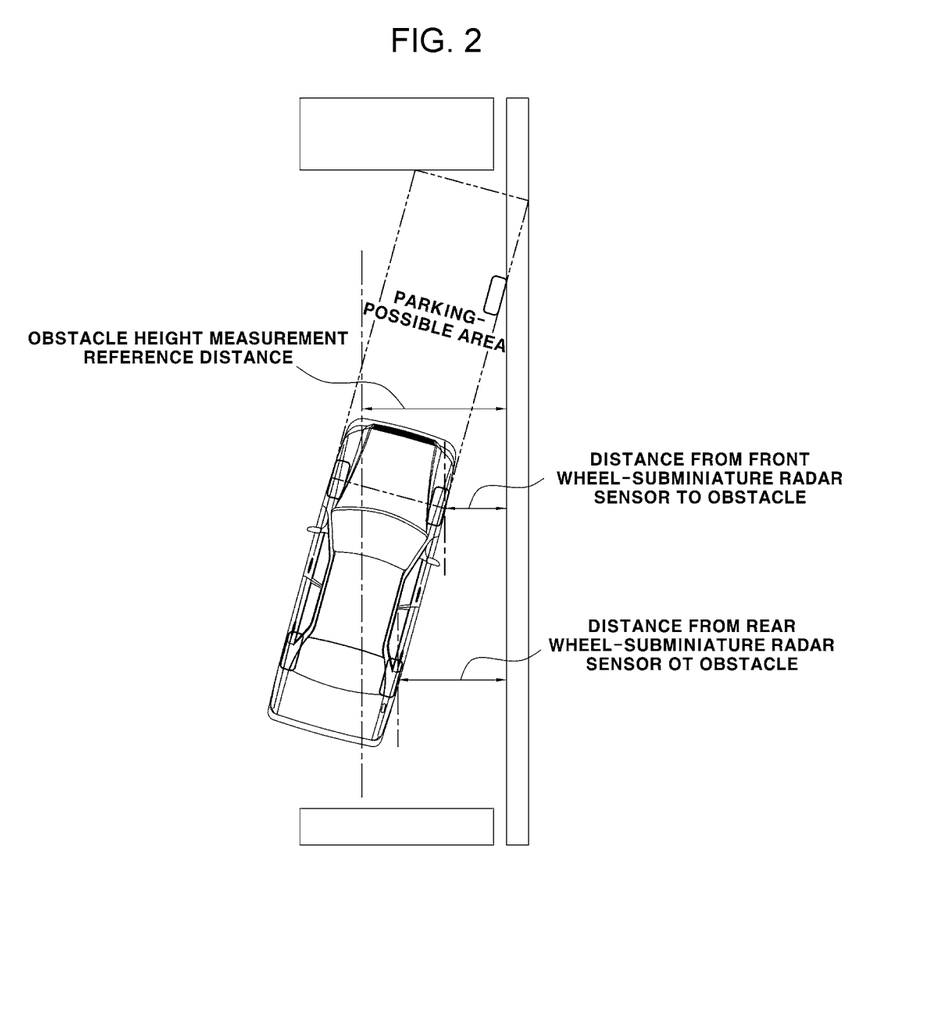
FIG. 2 is a schematic diagram showing an example of detecting the distance from an obstacle by a distance sensor in the system for detecting the height of an obstacle according to an exemplary embodiment of the present invention.

For example, referring to FIG. 2, when a vehicle enters a parking-possible area (space), the distance sensors 21 on wheels detect the distances from obstacles such as curbs at sides of the vehicle.

When the distance sensors 21 detect a distance within a reference measurement distance (e.g., about 1 m) from an obstacle, they output an enable-signal which may be used as effective data in the controller.

When a distance detecting signal is transmitted from the distance sensors 21 to the controller 31 through the wireless transmitter 22 and the wireless receiver 32, the controller 31 starts a determination (an algorithm) for estimating the height of the obstacle.

The controller, first, checks whether the signal from the distance sensor is effective data to determine the height of the obstacle (S105).

Figure 3:
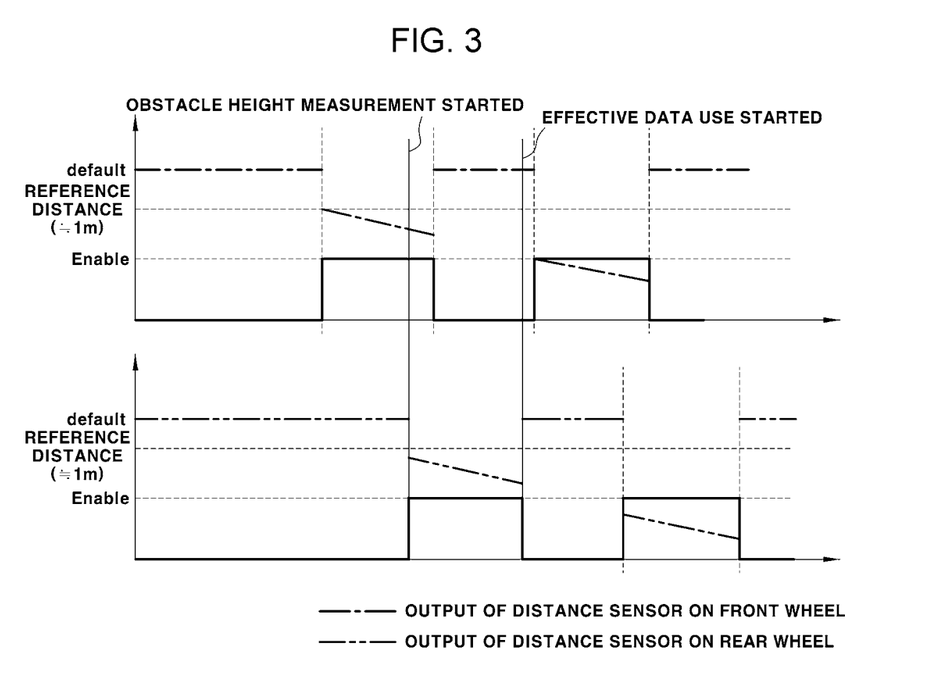
FIG. 3 is a graph showing an example of checking effective data using a detecting signal from the distance sensor in the system for detecting the height of an obstacle according to an exemplary embodiment of the present invention.

Referring to FIG. 3, the controller 31 determines that the detecting signal is ineffective data when the distance from the obstacle detected by the distance sensor 21 exceeds the reference distance, and determines that it is effective data when a signal within the reference distance is received together.

Next, the controller 31 performs actual determination for measuring the height of the obstacle, and a process of measuring the height of an obstacle close to the front wheels (S106) and a process of measuring the height of an obstacle close to the rear wheels (S107) proceeds in the same way.

That is, when determining the height H of an obstacle, the controller 31 determines first an obstacle height $H_F$ with respect to the front wheels during forward parking and determines first an obstacle height $H_R$ with respect to the rear wheels during rear parking.

The height H of an obstacle determined by the controller 31 may be the average of the height $H_F$ of an obstacle close to the front wheels and the height $H_R$ of an obstacle close to the rear wheels (S108).

The process of measuring the height of an obstacle by the controller is described hereafter.

Figure 4:
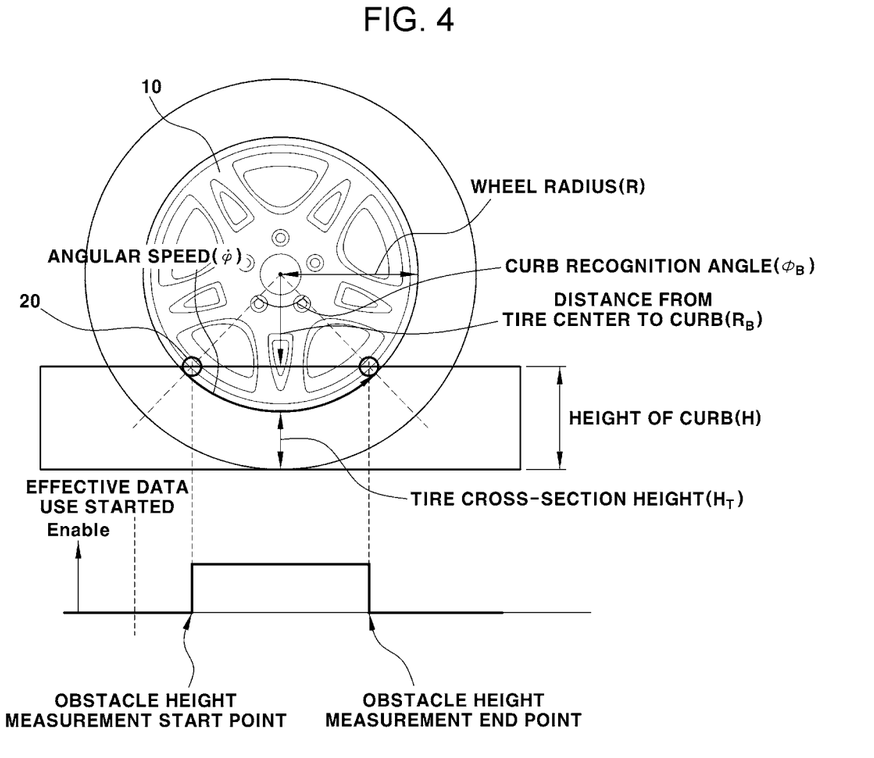
FIG. 4 is a schematic diagram showing an example of measuring the height of an obstacle by the system for detecting the height of an obstacle according to an exemplary embodiment of the present invention.

FIG. 4 is a schematic diagram showing an example of measuring the height of an obstacle by the system for detecting the height of an obstacle according to an exemplary embodiment of the present invention.

First, the controller is configured to determine an obstacle recognition angle $\Phi_B$ which is the angle between a start point and an end point where the distance sensor 21 measures the maximum height of an obstacle from the center of a wheel as a distance when the wheel is rotating.

In detail, when determining the obstacle recognition angle $\Phi_B$, the controller 31 multiplies an output time t of a signal detected from the start point to the end point where the distance sensor 21 recognizes the maximum height of the obstacle by measuring the distance by the angular speed $\overline{\varphi}$ received from a wheel speed sensor, as in the following Equation 1.

$$\Phi_B = \text{angular speed}(\overline{\varphi}) \times t \qquad \text{(Equation 1)}:$$

Next, the controller 31 determines the vertical distance $R_B$ from the center of the wheel to the obstacle using the obstacle recognition angle $\Phi_B$ determined from Equation 1.

That is, the controller 31 determines the vertical distance $R_B$ from the center of the wheel to the obstacle using a wheel radius R and the obstacle recognition angle $\Phi_B$, as in the following Equation 2.

$$R_B = R \times \cos(\Phi_B/2) \qquad \text{(Equation 2)}:$$

Next, the controller 31 determines the height of the obstacle using the wheel radius R and a tire cross-section height $H_T$, including the vertical distance $R_B$ from the center of the wheel to the obstacle.

That is, the controller 31 determines the height H of the obstacle using the wheel radius R and the tire cross-section height $H_T$, including the vertical distance $R_B$ from the center of the wheel to the obstacle, as in the following Equation 3, and the wheel radius R and the tire cross-section height $H_T$ are stored in advance in the controller in accordance with the specification of the vehicle.

$$H = H_T + (R - R_B) \qquad \text{(Equation 3)}:$$

When determining the height H of the obstacle, controller 31 separately determines the height $H_F$ of an obstacle close to the front wheels and the height $H_R$ of an obstacle close to the rear wheels through the same process as the process described above, and determines the final height H of the obstacle as the average of height $H_F$ of the obstacle close to the front wheels and the height $H_R$ of the obstacle close to the rear wheels.

$$H=(H_F+H_R)/2 \quad \text{(Equation 4)}:$$

Next, the controller 31 determines whether the vehicle can cross over the obstacle such as a curb, after determining the height H of the obstacle.

To the present end, the controller 31 includes a storage that keeps the vehicle body height of a vehicle (e.g., the height from the ground to the bottom portion of a bumper stored in advance in the storage) and a door height value, and a comparer-determiner that compares the door height value stored in the storage and the height H of an obstacle determined by the obstacle height measurement module.

Accordingly, the controller 31 compares the vehicle body height (e.g., the front bumper height and the rear bumper height) according to the specification of a vehicle and the height H of an obstacle, and then, determines that the vehicle can cross over the obstacle when the vehicle body height is greater, and determines that the vehicle cannot cross over the obstacle when the height H of an obstacle is greater.

In detail, the controller 31 compares a value obtained by adding a specific offset value to the vehicle body height stored in the storage with the height H of an obstacle to determine whether the vehicle can cross over the obstacle, and then, determines that the vehicle can cross over the obstacle when the value obtained by adding a specific offset value to the vehicle body height is the same as or greater than the height H of the obstacle, as the result of comparison, and determines that the vehicle cannot cross over the obstacle when the height H of the obstacle is greater.

When determining that the vehicle body height (the front bumper height) is greater than the height H of the obstacle and the vehicle can cross over the obstacle, the controller 31 transmits a driving-allowed signal showing that the vehicle may be driven until wheels reach or cross over the obstacle to a control unit in an existing parking assistance system.

For example, the controller is configured to determine that a vehicle can cross over an obstacle and controls a display that a driver can see to generate and show the trajectory of the vehicle when the control unit of an existing parking assistance system receives the passing-possible determination signal.

Accordingly, the parking-possible area which is detected by the parking assistance system may be secured more widely to the space where tires reach or cross over an obstacle and as a wider park-allowable area of a vehicle is secured, parking assistance may be more stably performed.

Figure 6:
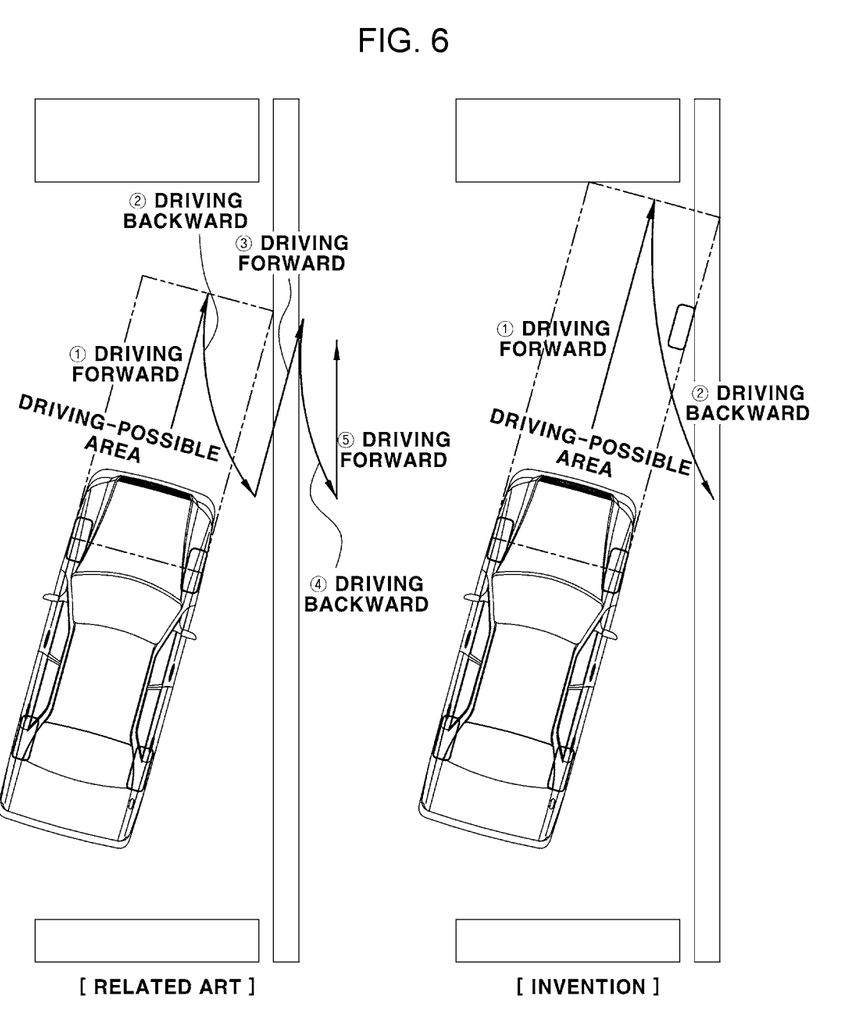
FIG. 6 is a schematic diagram comparing the behavior of a vehicle by a parking assistance method of the related art and the behavior of a vehicle according to the parking assistance method by the present invention.

Referring to the left diagram in FIG. 6, when a vehicle is assisted to park by an existing parking assistance system to which the present invention is not applied, the vehicle is repeatedly driven forwards and backwards such as driving forward into a parking-possible area and then driving backward due to an obstacle, so it takes long time to park in accordance with the parking assistance.

Referring to the right diagram in FIG. 6, when the system for detecting the height of an obstacle of the present invention determines that a vehicle can cross over an obstacle because a vehicle body height is greater than the height H of an obstacle, the vehicle may be driven forward into a parking-possible area until tires reach or cross over the obstacle, so parking may be rapidly finished by parking assistance without repeatedly driving forwards and backwards thereof.

Meanwhile, as described above, when the controller 31 determines that the height H of an obstacle is greater by comparing the vehicle body height with the height of the obstacle and then determines that the height H of the obstacle is greater than the door height by comparing again the height H of the obstacle and the door height (e.g., which is the height from the ground to the bottom portion of a door and is stored in advance in the storage of the controller in accordance with the specification of the vehicle), the controller 31 executes a logic that restricts opening of doors.

That is, when the comparer determiner of controller 31 determines the height H of an obstacle is greater than the door height by comparing the door height value stored in the storage and the height H of the obstacle determined by the obstacle height measurement module, a warning logic that restricts opening of doors is executed.

Furthermore, when the comparer-determiner of the controller is configured to determine that the height H of the obstacle is greater than the door height, a control signal is applied to a warning unit from the controller, whereby a warning signal that prevents doors from opening to the obstacle is output to the warning unit when parking is finished.

Figure 7:
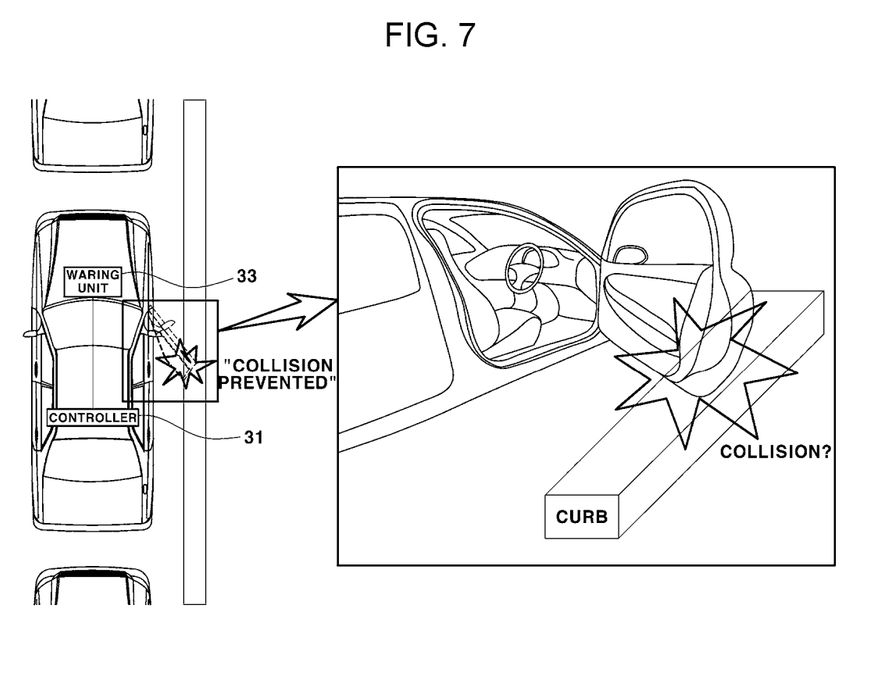
FIG. 7 is a schematic diagram showing an alarm for door opening restriction in the system for detecting the height of an obstacle according to an exemplary embodiment of the present invention.

To the present end, as shown in FIG. 7, a warning unit 33 (e.g., a display for visual warning or a buzzer for aural warning) that outputs a warning signal for preventing door from opening to an obstacle is connected to the controller 31 such that electrical signals may be transmitted therebetween.

Accordingly, when the comparer-determiner of the controller 31 determines that the height H of an obstacle is greater than the door height, the controller 31 transmits an operation signal to the warning unit 33 so that the warning unit 33 aurally and/or visually warns passengers, whereby it is possible to prevent the passengers from unintentionally opening doors. Therefore, it is possible to prevent doors from being opened and damaged by an obstacle.

When outputting a warning signal to the warning unit 33, the controller can output warning only when a person is in the seat close to an obstacle by determining whether there is a passenger in the seat close to the obstacle, because the person in the seat close to the obstacle is a person who can open the door.

A seat sensor, a camera for detecting passengers in the respective seats, and an ultrasonic sensor may be used to determine whether there is a person in a seat close to an obstacle, but it is not shown in the figures.

Accordingly, when receiving a detecting signal from a seat sensor, a camera for detecting a passenger in a seat, and an ultrasonic sensor, the controller 31 determines that there is a passenger in the seat close to an obstacle and outputs a warning signal to the warning unit.

Accordingly, when outputting a warning signal for preventing doors from opening to an obstacle at the end portion of parking, the controller 31 outputs first a primary warning signal through the warning unit such as a display or a speaker in the vehicle if the door is not open yet. Further, when the controller 31 determines that a door is attempted to be opened (e.g., when the controller receives a signal from a lever sensor sensing that a door open lever on a door indoor panel is pulled), it outputs a signal for performing an automatic door lock function to a door-locking control unit (not shown) to prevent damage to doors, whereby it is possible to more easily prevent light contact with an obstacle when a door is opened by preventing the door from opening.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for detecting a height of an obstacle for parking assistance, the system comprising:
    a distance measurement module including:
        a distance sensor configured for measuring a distance from the obstacle positioned at a side of a vehicle; and
        a wireless transmitter coupled to the distance sensor and wirelessly transmitting a measured value of the distance of the distance sensor;
    a wireless receiver configured for receiving the measured value of the distance of the distance sensor from the wireless transmitter; and
    a controller connected to the wireless receiver and configured for determining the height of the obstacle on a basis of the received measured value,
    wherein the controller is configured to determine the height of the obstacle based on an output time of a signal detected from a start point to an end point where the distance sensor recognizes a maximum height of the obstacle and an angular speed received from a wheel speed sensor.

2. The system of claim 1, wherein the distance sensor is any one selected from a radar sensor, a subminiature radar sensor, and a laser sensor.

3. The system of claim 1, wherein the wireless transmitter and the wireless receivers are Radio Frequency (RF) type communication modules.

4. The system of claim 1,
    wherein the controller is configured to determine when the vehicle crosses over the obstacle through:
        a process of determining an obstacle recognition angle which is an angle between the start point and the end point where the distance sensor measures the maximum height of the obstacle from a center of a wheel of the vehicle when the wheel is rotating;
        a process of determining a vertical distance from the center of the wheel to the obstacle using the determined obstacle recognition angle;
        a process of determining the height of the obstacle using a distance from the center of the wheel to the obstacle, a radius of the wheel, and a tire cross-section height; and
        a process of comparing the determined height of the obstacle with a predetermined vehicle body height.

5. The system of claim 4, wherein the controller is configured to determine the obstacle recognition angle by multiplying the output time of the signal detected from the start point to the end point where the distance sensor recognizes the maximum height of the obstacle by the angular speed received from the wheel speed sensor.

6. The system of claim 4, wherein the controller is configured to determine the vertical distance from the center of the wheel to the obstacle using an equation of $R_B = R \times \cos(\Phi_B/2)$, wherein the R is the radius of the wheel, the $R_B$ is the vertical distance, and the $\Phi_B$ is the obstacle recognition angle.

7. The system of claim 4,
    wherein the controller is configured to determine the height of the obstacle using an equation of $H = H_T + (R - R_B)$, wherein the H is the height of the obstacle, the $H_T$ is the tire cross-section height, the R is the radius of the wheel, and the $R_B$ is the vertical distance.

8. The system of claim 4,
    wherein the obstacle includes a first obstacle and a second obstacle; and
    wherein the controller is configured to determine the height of the obstacle as an average value between a height of the first obstacle adjacent to front wheels of the vehicle and a height of the second obstacle adjacent to rear wheels of the vehicle.

9. The system of claim 8,
    wherein, when the controller determines the height of the obstacle, the controller is configured to determine at first the height of the first obstacle with respect to the front wheels of the vehicle during forward parking of the vehicle and is configured to determine first the height of the second obstacle with respect to the rear wheels of the vehicle during rear parking of the vehicle.

10. The system of claim 4,
    wherein the obstacle includes a first obstacle and a second obstacle; and
    wherein, when the controller determines the height of the obstacle, the controller is configured to determine at first a height of the first obstacle with respect to front wheels of the vehicle during forward parking of the vehicle and is configured to determine first a height of the second obstacle with respect to rear wheels of the vehicle during rear parking of the vehicle.

11. The system of claim 4, wherein the controller includes:
    a storage for storing the predetermined vehicle body height of the vehicle and a door height value; and
    a comparer-determiner for comparing the determined height of the obstacle with the predetermined vehicle body height or the door height value stored in the storage.

12. The system of claim 11, wherein the controller is configured to compare a value obtained by adding a predetermined offset value to the predetermined vehicle body height kept in the storage with the height of the obstacle to determine when the vehicle crosses over the obstacle, and then, is configured to determine that the vehicle crosses over the obstacle when the value obtained by adding a predetermined offset value to the predetermined vehicle body height is a same as or greater than the height of the obstacle and is configured to determine that the vehicle cannot cross over the obstacle when the height of the obstacle is greater than the height of the obstacle.

13. The system of claim 1, wherein the controller further includes:
    a warning unit outputting a warning signal for preventing a door from opening to the obstacle at an end portion of parking in a response to a control signal from the controller when the controller determines that the height of the obstacle is greater than a door height value of the door.

14. The system of claim 13, wherein when the controller outputs a warning signal to the warning unit, the controller is configured to output warning when a person is detected to be located in a seat of the vehicle adjacent to the obstacle by determining when there is the person in the seat adjacent to the obstacle.

15. The system of claim 14, wherein the controller is configured to determine when there is the person adjacent to the obstacle by receiving a signal from a seat sensor, a camera for detecting the passenger in the seat, and an ultrasonic sensor which are devices determining when there is the person adjacent to the obstacle.

16. The system of claim 13, wherein when the controller outputs a warning signal for preventing the door form opening to the obstacle at the end portion of parking of the vehicle, the controller is configured to output first a primary warning signal through a display or a speaker in the vehicle when the door is not open yet, and outputs a signal for performing an automatic door lock to prevent damage to the door when the door is attempted to be opened.

* * * * *